March 4, 1958

J. SOBISCH 2,825,561

RECORD FEEDER DEVICE FOR ACCOUNTING
MACHINES, PARTICULARLY
PUNCHED-CARD MACHINES

Filed Nov. 26, 1956

Inventor:

Johannes Sobisch

United States Patent Office 2,825,561
Patented Mar. 4, 1958

2,825,561

RECORD FEEDER DEVICE FOR ACCOUNTING MACHINES, PARTICULARLY PUNCHED-CARD MACHINES

Johannes Sobisch, Bielefeld, Germany, assignor to Anker-Werke Aktiengesellschaft, Bielefeld, Germany, a corporation of Germany Application November 26, 1956, Serial No. 624,395

6 Claims. (Cl. 271—3)

My invention relates to a record feeder device for accounting machines and similar business machines or computers which operate with record cards that supply part of the data, required for an accounting or computing operation, in form of punched holes or other scannable marks. Such marks may denote an identifying account number, the old balances of the account such as the total credit and total debit values, as well as any necessary control or monitoring intelligence. In many cases, the operator of the machine takes the cards individually from a pile and places them onto a card table which forms part of the machine and from which, at the beginning of an accounting run, the card is automatically seized by a conveyor device and passed to conveyor means within the machine; and these conveyor means transport the card to the various operational locations in accordance with the particular operating program of the accounting run. After completion of the accounting operation the card reaches a location accessible to the operator, and a new card is passed into the machine.

Relating generally to machines of the above-mentioned type, it is an object of my invention to improve the card feeder device—particularly the card-receiving and card-discharging means as well as the means for passing the cards from the card-receiving place to the interior conveying means of the machine and from the latter conveying means to the card-discharge place—so that the last-processed card remains temporarily at an accessible location from which it can be manually removed by the operator, for instance for checking purposes, before the card is ultimately passed into a collecting box.

To this end, and in accordance with a feature of my invention, I provide the record feeder device of the machine, aside from the card-receiving "lay-on" table and the card-collecting box, with an intermediate card support or lay-off container which is accessible to the operator and upon which each card, after passing through a complete accounting run, is temporarily laid off for checking purposes; and I provide the feeder device with conveying mechanisms for passing the individual cards from the lay-on table into the machine and thence to the intermediate lay-off container, and thereafter to the final collecting place, all these mechanisms being operative in automatic dependence upon the operation of the accounting or computing machine proper.

According to another, more specific feature, a conveyor mechanism is provided which takes the card from the card table to pass it to interior conveyor means of the machine, for instance a card carriage, and which, after completion of the accounting operation, is again active to receive the processed card from the interior conveyor means and to then pass it onto the intermediate lay-off place, a card flip-over device being provided to thereafter remove the card from the intermediate lay-off place and deposit it in the collecting box. The transfer of a card from the intermediate lay-off to the collecting box takes place when a new card is being passed from the lay-on table into the interior of the machine. Consequently, each card, after being processed, remains within easy reach of the operator for a period of time sufficient for any checking that may be needed, for instance, when the machine, upon scanning the account number, has rejected a card as false or when another, inadvertently omitted accounting operation must be made with the same card.

Since the lay-on and lay-off places of a device according to the invention are located at the front of the machine close to the operator's place, the device affords comfortable attendance and saves time-consuming travel by the operating person who, seated in front of the keyboard of the machine, can readily supervise the course of the accounting performance including the insertion and discharge of the account cards. The cards deposited in the collecting box are piled in the sequence corresponding to that of the completed accounting operations and hence can be used without further sorting.

The above-mentioned and other objects, advantages and features of my invention, will be apparent from the embodiment illustrated by way of example on the drawings and described in the following. On the drawings.

Figure 1:
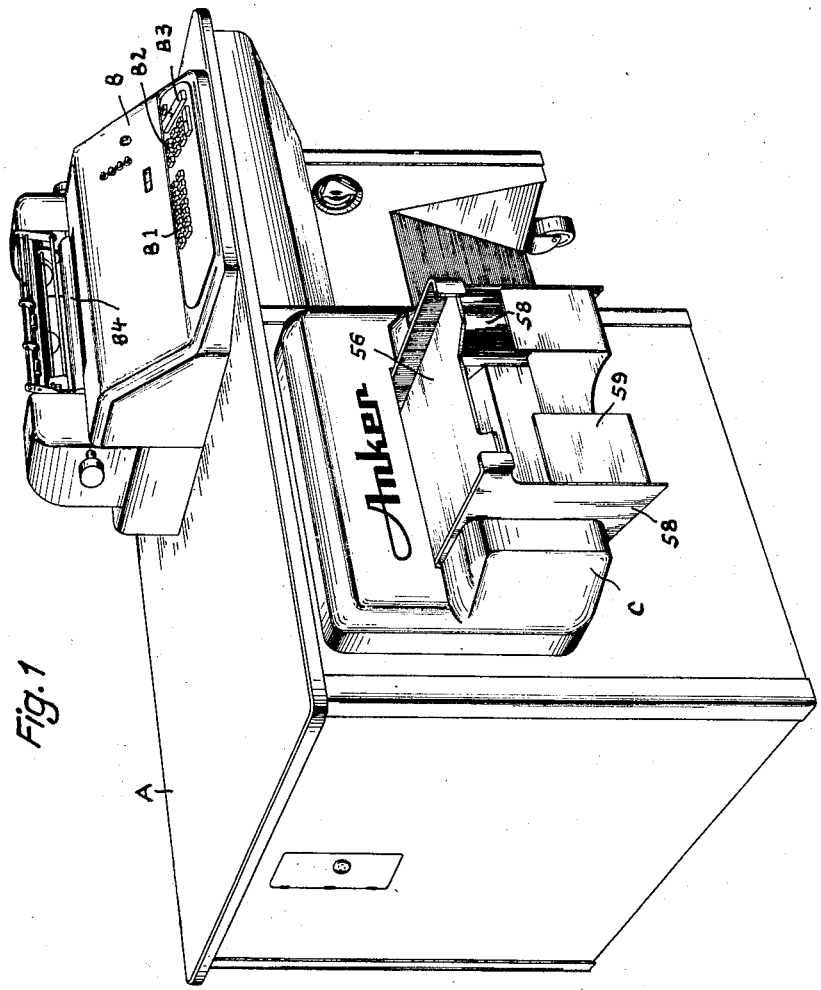
Fig. 1 is a perspective view of a punched-card accounting machine provided with a record feeder device according to the invention, the card-collecting box being removed.

As shown in Fig. 1, the complete accounting machine comprises a desk-like structure which provides a working table surface for the operator and carries a keyboard and printing apparatus B generally shaped and equipped in the manner of a typewriter. The apparatus B is provided with a keyboard B1 for alphabetical-numerical information, a ten-key board B2 for entering calculating amounts into the machine, a motor bar B3 for starting the accounting run of the machine after it has been properly set up for operation, and a printing device B4 for entering typed records on ledger sheets, vouchers, and other records on which the accounting result is to appear in legible form.

The desk structure A forms a housing for a number of devices that are to cooperate with the apparatus B and with punched-hole data cards supplied by means of a feeder device C. The internal components housed in the desk structure A comprise scanning means for co-operation with the punched holes, calculating apparatus, memory devices, and means for punching holes into the cards in accordance with the result of the accounting operation. These devices, as well as further details of the apparatus B are not illustrated and not further described in this specification because they are generally known as such and not essential to the invention proper, the apparatus B being illustrated mainly for showing its spacial relation to the record feeder device C and to the location of the person operating the machine. However, if desired, reference for details may be had, for instance, to my U. S. Patent 2,765,116 and to the copending application Serial No. 624,241, filed November 26, 1956, of J. Sobisch et al., both assigned to the assignee of the present invention.

For performing an accounting operation, the operator seated in front of the keyboards, places the account card onto a lay-on table 56 of the feeder device C and also enters the data of the new transaction into the keyboard apparatus B so that this information appears in print on the ledger sheet or other record inserted into portion B4 of the apparatus. When the machine is thus set up, the operator depresses the motor bar B3 which sets the accounting machinery into operation for a single run.

At the beginning of this operation, the account card is automatically conveyed from lay-on table 56 into the machine where the punched holes of the card are scanned and the information thus supplied is properly computed together with the input information from keyboard apparatus B. In this manner, the result of the new transaction is incorporated into the account and is printed on the record at B4 and also recorded on the card by the punching of a new group of holes. After completion of the accounting operation, the card is ejected back from the interior of the machine into the feeder device C where it becomes deposited face-up in an intermediate lay-off container 59. At this location the card remains easily accessible to the operator until such time as a new card is placed onto the lay-on table 56 and a new accounting run is initiated by depressing the motor bar B3. The subsequent operation has the effect of causing the card to be deposited from the intermediate lay-off place into a collecting box (67 in Fig. 2) beneath the lay-off container 59. At the same time the card is automatically turned face down, so that the pile of cards collecting in the box is properly sorted in the sequence of the accounting operations.

The details of the feeder device C (Fig. 1) will now be described mainly with reference to Figs. 2 and 3.

The side walls 3 and 3a of the machine frame structure are provided with openings 1, 2 (Fig. 2) which are traversed by two drive shafts 4, 5 and a main control shaft 6. Mounted on, and pinned to, the main control shaft 6 are three cams 7, 8 and 9. Cam 7 cooperates with the roller 11 of an angular lever 12 which is rotatably mounted on side wall 3 by means of a pivot pin 10. Cam 8 cooperates with the roller 14a of a lever 14 which is rigidly joined with a switching shaft 13 journalled in the side walls 3 and 3a. Cam 9 cooperates with the roller 24 of an angular lever 16 (Figs. 2, 3) which is pivoted by means of a pivot pin 17 to a bearing structure 18 firmly connected with a card guide 19 of sheet metal. The lever 16 is biased counter-clockwise (Fig. 2) by a spring 20 attached to the side wall 3. Revolvably mounted on a limb 16a of lever 16 is a roller 21 which, at the proper time, can cooperate with a feeder roller 22 (Figs. 2, 3) mounted on, and rigidly pinned to, the drive shaft 5.

A spur gear 25 is rotatably mounted on a bearing pin 23 secured to the side wall 3. A link 26 of angular shape has one end joined by a pivot pin 27 with the spur gear 25. The other end is pivotally linked to cam 7 by a pin 28. Link 26 is thus capable of transmitting driving motion from main control shaft 6 to spur gear 25. Spur gear 25 meshes with a coupling pinion 29 (Figs. 2, 3) which in turn meshes with a spur gear 32 engaging a pinion 31 on drive shaft 5. The gear train 29—32—31 drives the shaft 5 and the feed roller 22 from spur gear 25 at the proper time during the interval in which the spur gear 25 is being rotated through link 26 by cam disk 7 on main control shaft 6.

A second feed roller 37 is rigidly mounted on another shaft 36 which is revolvable in a frame structure composed of lateral parts 33, 34 and connecting lugs 35 that protrude through the openings 1 and 2 of the side walls 3, 3a. The shaft 36 of the second feed roller 37 carries a pinion 38 which meshes with the spur gear 25 so that the above-mentioned temporary rotation of spur gear 25 is also imparted to the feed roller 37. The frame composed of parts 33 to 35 is normally held in the position shown in Fig. 2 by means of two links 40 pivoted at 40′ to the respective side walls 3, 3a, and by means of the lever 12 which has its limb 12a pivotally linked to the lateral frame part 33 and is kept in the illustrated position by means of the roller 11 resting against cam 7.

Figure 2:
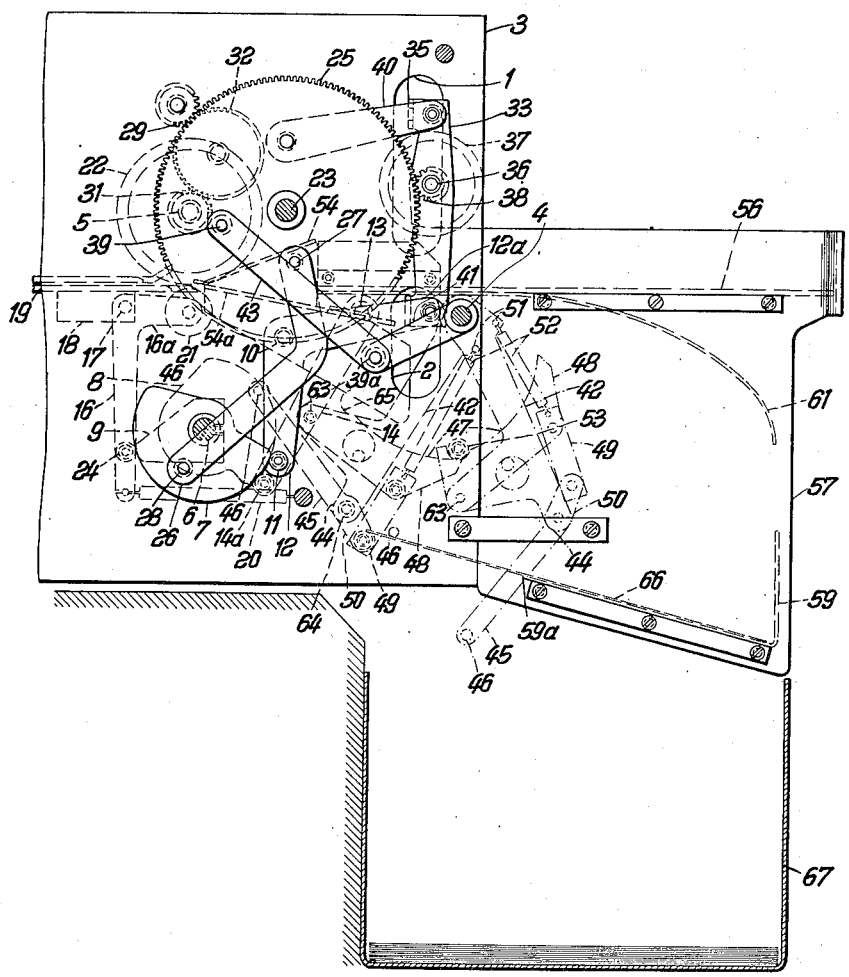
Fig. 2 is a part-sectional side view of the feeder device including the card-collecting box.
Figure 3:
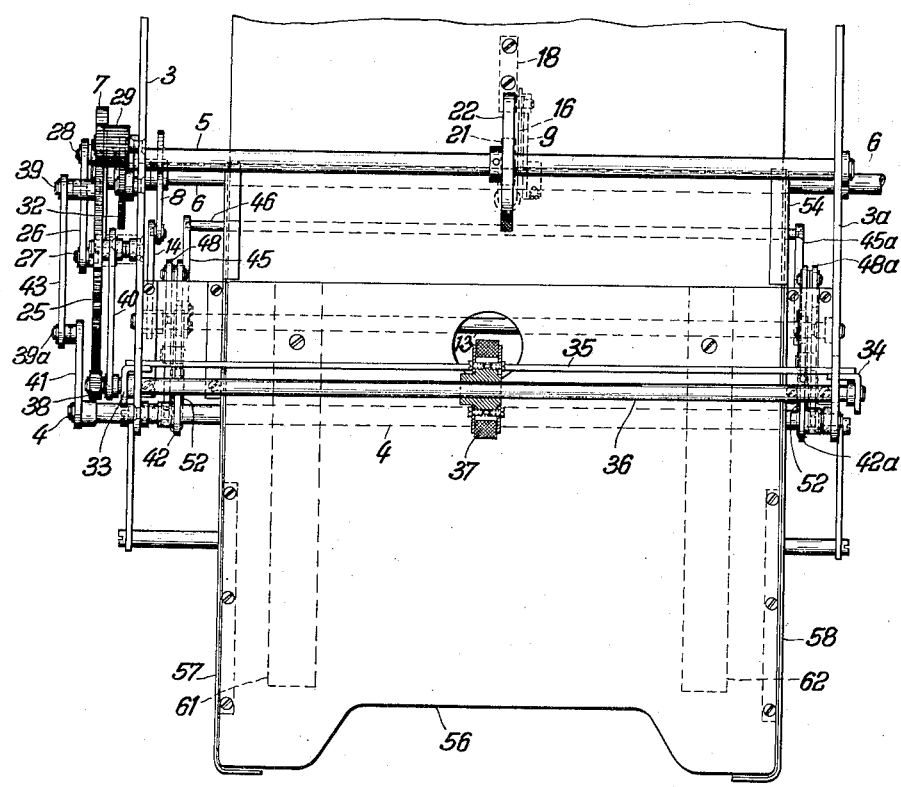
Fig. 3 is a view from above onto the card table of the feeder device.

Firmly mounted on shaft 4 are a driving crank 41 (Fig. 3) and two switching levers 42 and 42a (Figs. 2, 3). A linking bar 43 (Figs. 2, 3) is joined by a pivot pin 39 with spur gear 25 and by a pivot pin 39a with the crank 41. During rotation of spur gear 25 the linking bar 43 imparts a rotary movement to the crank 41 and thus to shaft 4.

Only one of the two switching levers, namely the lever 42, is shown in Fig. 2 which, however, illustrates this lever, as well as the associated parts 44 to 52 described below, in two positions of operation. The normal position is shown by broken lines and a temporary operating position by dot-and-dash lines.

The two switching levers 42, 42a have respective extensions 44 (Fig. 2) each pivotally joined at 64 with a toggle lever 45. The two toggles 45 are connected with each other by a rod 46 (Figs. 2, 3). Two cam pieces 48, 48a (Figs. 2, 3) are pivotally joined with the respective switching levers at 63. The cam pieces 48, 48a are each connected by a link 49 (Fig. 2) with an extension 50 of one of the respective toggle levers 45. Each switching lever 42, 42a has an eye 51 for attachment of a spring 52 whose other end is secured to the link 49. The two springs 52 bias the cam pieces 48, 48a and, through the links 49 also the toggle levers 45, counter-clockwise (Fig. 2) about the respective pivot points 63 and 64. Normally, however, rotary movement of the cam pieces 48, 48a is prevented by respective rollers 53 which are mounted on the side walls 3, 3a and form a stop for the cam contours 47 of cam pieces 48.

Secured to the switching shaft 13 is a funnel-shaped card trap 54 (Fig. 2) whose purpose and functioning will be described in a later place.

The lay-on table 56 is fastened by screws to the machine frame structure and supports by its two side walls 57, 58 an intermediate lay-off container 59 (Figs. 1, 2). Disposed between the card table 56 and the machine frame are two leaf springs 61, 62 (Figs. 2, 3) which prevent the cards from being flung out of the intermediate lay-off container 59 as will be explained below.

During each individual accounting run of the machine the main control shaft 6 performs a single complete revolution in two intermittent steps of 180 degrees between which the accounting operation proper is performed. The means for providing such a two-step revolution are not illustrated because they are customary in machines of this type. However, it may be mentioned that in such machines a gear is continuously driven by a motor as long as the machine is kept ready for operation, and the main control shaft 6 is connected with the continuously rotating gear by means of a single-revolution clutch to first perform one-half revolution, whereafter the shaft 6 is stopped a given interval of time during which the account card is being processed and is then released for the remaining one-half revolution.

The operation of the feeder device is as follows:

As mentioned, after the operator has entered the data of a transaction on the keyboard apparatus and has placed the corresponding account card onto the lay-on table 56, he actuates the motor bar (B3 in Fig. 1) and thus releases the machine operation as well as the above-mentioned single-revolution clutch so that now the main control shaft 6 is driven clockwise (Fig. 2) and rotates the cams 7, 8 and 9. During the first step of 180° rotation, the cam 7, acting through link 26, turns the spur gear 25 counter-clockwise. Gear 25, acting through pinion 36, now rotates the feed rollers 37 clockwise and simultaneously causes the gear train 29—32—31 to also rotate the feed roller 22 clockwise. The clockwise rotation of cam 7 has also the effect of releasing the roller 11 of angular lever 12 so that the frame structure 33 to 35 is lowered by its own weight and places the feed roller 37 into frictional engagement with the account card located on card table 56. At the same time, the main control shaft 6 turns the cam 9 out of the range of roller 24 on angular lever 16. Lever 16, therefore, is turned counter-clockwise by the force of spring 20 so that the roller 21 journalled on limb 16a abuts against the feed roller 22.

At first the rotation of control shaft 6 has no effect upon the switching shaft 13 which carries the card trap 54 because the lever 14 is still kept in the position shown in Fig. 2 by means of its roller 14a abutting against cam 8.

The feed roller 37, when thus being driven clockwise from spur gear 25, seizes the account card on table 56 and moves it toward the left (Fig. 2) where it enters the active range of feed roller 22 which is likewise rotating clockwise and which conveys the card to the interior conveyor means, such as a card carriage (not illustrated), of the machine.

The above-mentioned rotary movement of spur gear 25 in the counter-clockwise direction also causes the linking bar 43 and the switching lever 41 to turn the shaft 4 and thus also the switching levers 42, 42a counter-clockwise from the broken-line position shown in Fig. 2 to the position indicated by dot-and-dash lines. During this movement of shaft 4, the cam pieces 48, biased by their respective springs 52 into engagement with the rollers 53 on side walls 3, 3a, move along these rollers and thus displace through links 49 the toggle levers 45 a certain amount in the counter-clockwise direction, due to the continuously diminishing radial spacing between the axis of shaft 4 and the cam contour 47. Near the end of this movement, a recess 65 in cam contour 47 snaps over the roller 53 so that the just-mentioned spacing is suddenly diminished a larger amount. This causes the spring 52 to impart through link 49 to the toggle lever 45 a counter-clockwise snap-action movement into the dot-and-dash position. Assuming that no account card is located in the intermediate lay-off container 59 at this time, the just-mentioned snap movement remains ineffective.

When, after completed accounting operation, the account card is returned from within the machine to the feed roller 22, the main control shaft 6 is again in operation to perform the remaining 180° of rotation. During rotation, the cam 8 moves clockwise to such an extent that the lever 14 is released. This lever is biased by a spring (not illustrated) in the clockwise direction so that the card trap 54 mounted on shaft 13 is likewise turned clockwise. This moves a laterally-bent or flange-like portion 54a of the trap 54 out of the range of the normal card traveling path. Simultaneously the angular lever 12 is now turned counter-clockwise by cam 7 whereby the limb 12a lifts the frame structure 33 to 35 with feed roller 37 into the inactive position illustrated in Fig. 2. Due to the same movement of cam 7, the angular lever 26 imparts to spur gear 25 a clockwise return motion so that now the feed roller 22, driven through the gear train 29—32—31, rotates counter-clockwise. As a result, the processed car is again seized by the feed roller 22 and is moved toward the right (Fig. 2). The leading edge of the card is now guided by the lateral flange portion 54a of the displaced card trap 54 and thus is constrained to move on an inclined path downwardly to the intermediate lay-off container 59. The above-mentioned leaf springs 61, 62 are now effective to brake the considerable velocity of the traveling card thus preventing it from flying out of the container. At the same time the spur gear 25 acts through the connecting links 43, 41 upon the shaft 4 and thus returns the switching levers 42, 42a from the dot-and-dash position into the normal position shown in Fig. 2 by broken lines.

The cam 9 mounted on the main control shaft 6 also returns to the normal, inactive position shown in Fig. 2 while turning the angular lever 16 clockwise so that the roller journalled on limb 16a is released from the feed roller 22.

When thereafter, by actuation of the motor bar, another machine run is initiated, then, during the first 180° rotation of the main control shaft, a card previously placed upon the card table 56 is conveyed into the interior of the machine by means of the feed rollers 37 and 22 in the above-described manner. The rotary movement of shaft 4, imparted thereto from spur gear 25 through the connecting link 43 and the crank 41, causes the switching levers 42, 42a to turn again in the counter-clockwise direction. During this movement the rod 46 of the toggle levers 45 passes over the account card 66 then located in the intermediate container 59 so that, when the recesses 65 reach the rollers 53, the account card is tipped over the edge 59a (Fig. 2) of the intermediate container 59 and drops into the collecting box 67 beneath the intermediate container 59. While the account card 66 lies face-up in the intermediate container for convenient inspection by the operator, the just-mentioned flipping operation has the effect of placing the account card face-down into the box 67 so that the processed and discharged cards are collected in a pile in the sequence corresponding to that of the accounting operations.

In the further course of rotation of the main control shaft 6, that is during the remaining 180° of shaft rotation occurring after the account card is completely processed in the machine, the processed account card is conveyed by means of the feed roller 22 and the card trap 54, now turned upward by means of the lever 14, to reach the intermediate container 59 in the above-described manner, while the switching levers 42, 42a and thus the flip-over device 45 are returned to the original position of rest. Until a new account card is placed into the machine, the previously processed card remains easily accessible in the intermediate container 59 and can readily be removed therefrom by the operator if checking or exchange is necessary.

It will be obvious to those skilled in the art upon a study of this disclosure that details of feeder devices according to my invention can be varied in many respects without departing from the essential features of my invention and within the scope of the claims annexed thereto.

I claim:

1. In combination with an accounting machine, particularly punched-card machine, a record feeder device comprising a card lay-on table for receiving a card to be processed, an intermediate lay-off structure for temporarily accommodating the card after processing, final card-collecting means, reversible feed means engageable with the card on said table for conveying it into said machine and thereafter from said machine to said lay-off structure, discharging means engageable with the card on said lay-off structure for conveying the card to said final collecting means, and mechanisms connected with said feed means and discharging means for actuating them during operation of said machine, whereby each processed card remains temporarily accessible on said lay-off structure.

2. In combination with an accounting machine, particularly punched-card machine, a record feeder device comprising a card lay-on table for receiving a card to be processed, an intermediate lay-off structure for temporarily accommodating the card after processing, final card-collecting means, said lay-off structure being located beneath said table, said collecting means being located beneath said structure, first feed means engageable with the card on said table for conveying it into said machine, second feed means for conveying the card from said machine onto said lay-off structure, a flip-over device engageable with the card on said lay-off structure for dropping the card upside down from said structure into said container, and mechanisms connected with said first and second feed means and with said flip-over device for operating them sequentially during operation of said machine.

3. In a record feeder device according to claim 1, said lay-off structure forming a lay-off surface smaller than the cards to be processed and having an edge over which the card placed upon said structure projects, and said discharging means comprising a toggle mechanism having a snap-action member engageable with the projecting portion of the card on said structure, said member having a downward path of active motion so as to flip the card over said edge into said container while turning the card upside down.

4. In combination with an accounting machine, particularly punched-card machine, a record feeder device comprising a card lay-on table for receiving a card to be processed, an intermediate lay-off structure for temporarily accommodating the card after processing, final card-collecting means, a first feed roller and a second feed roller, said first feed roller being journaled above said table and engageable with the card on said table for feeding it toward said second feed roller, said second feed roller being journaled between said first feed roller and the interior of said machine and being engageable with the card, when the card comes from said first feed roller, for passing the card into said machine interior, said second feed roller being reversible for conveying the card in the opposite direction when the card returns from said machine interior, a card-guiding switch mounted between said two feed rollers and having two positions, said switch, when in one of said positions, forming a guide path between said first feed roller and said second feed roller and, when in the other position, forming a guide path from said second feed roller to said lay-off structure, and a control mechanism connected with said feed rollers and said switch for sequentially controlling them to pass a card from said table into the machine interior and thereafter from the interior onto said lay-off structure, and card discharging means connected with said mechanism to be driven therefrom and engageable with the card on said lay-off structure for conveying the card to said collecting means when said first feed roller is again active to feed another card from said table.

5. A record feeder device according to claim 4, comprising a frame on which said first feed roller is journaled, said frame being displaceable toward and away from said table whereby said first feed roller is engageable with the card on said table only when said frame is moved toward said table, and said control mechanism having lifting means connected with said frame for moving said member away from said table in dependence upon reversing operation of said second feed roller so that a new card placed upon said table remains disengaged by said first feed roller while the previous card is being conveyed to said lay-off structure.

6. In a record feeder device according to claim 5, said control mechanism comprising a control member intermittently rotatable in foward and reverse direction so as to perform a forward stroke at the start and a return stroke at the end of an accounting-machine operation, said two feed rollers being geared to said control member so as to run forward and reverse, respectively, during said two strokes, and transmission means connecting said control member with said lifting means and said card discharge means for operating them in fixed time relation to the rotation of said control member.

No references cited.

UNITED STATES PATENT OFFICE
CERTIFICATE OF CORRECTION

Patent No. 2,825,561                                           March 4, 1958

Johannes Sobisch

It is hereby certified that error appears in the above numbered patent requiring correction and that the said Letters Patent should read as corrected below.

In the heading to the printed specification, between lines 8 and 9, insert -- Claims priority, application Germany November 28, 1955 --.

Signed and sealed this 22nd day of April 1958.

(SEAL)
Attest:

KARL H. AXLINE
Attesting Officer

ROBERT C. WATSON
Commissioner of Patents